(12) United States Patent
Shimirak et al.

(10) Patent No.: US 8,275,229 B2
(45) Date of Patent: Sep. 25, 2012

(54) SEALING GLAND SYSTEM

(75) Inventors: Gerald L. Shimirak, Sedalia, CO (US); Derec Sheals, Dartford (GB)

(73) Assignee: Channell Commercial Corporation, Temecula, CA (US)

( * ) Notice: Subject to any disclaimer, the term of this patent is extended or adjusted under 35 U.S.C. 154(b) by 0 days.

(21) Appl. No.: 13/181,638

(22) Filed: Jul. 13, 2011

(65) Prior Publication Data

US 2011/0268416 A1 Nov. 3, 2011

Related U.S. Application Data

(62) Division of application No. 12/134,077, filed on Jun. 5, 2008, now Pat. No. 8,050,528.

(51) Int. Cl.
*G02B 6/00* (2006.01)
*H02G 15/02* (2006.01)

(52) U.S. Cl. ...................... 385/135; 174/77 R

(58) Field of Classification Search ............... 385/135; 174/77 R
See application file for complete search history.

(56) References Cited

U.S. PATENT DOCUMENTS

| | | |
|---|---|---|
| 1,840,127 A | 1/1932 | Penney |
| 2,612,393 A | 9/1952 | Dahlgren |
| 3,158,379 A | 11/1964 | Nava et al. |
| 3,869,155 A | 3/1975 | Hutchison |
| 3,891,330 A | 6/1975 | Vasas |
| 4,267,401 A | 5/1981 | Wilkinson |
| 4,515,991 A | 5/1985 | Hutchison |
| 4,622,436 A | 11/1986 | Kinnan |
| 4,724,278 A * | 2/1988 | Smith ............................ 174/38 |
| 4,927,227 A * | 5/1990 | Bensel et al. ................. 385/135 |
| 4,961,599 A | 10/1990 | Delery et al. |
| 5,007,701 A | 4/1991 | Roberts |
| 5,155,303 A | 10/1992 | Bensel et al. |
| 5,267,880 A | 12/1993 | Tamm |
| 5,290,073 A | 3/1994 | Chen |
| 5,301,959 A | 4/1994 | Gould |
| 5,389,005 A | 2/1995 | Kodama |
| 5,589,663 A | 12/1996 | Wales |
| 5,878,001 A | 3/1999 | McNeel et al. |
| 6,051,792 A * | 4/2000 | Damm et al. ................... 174/93 |
| 6,248,953 B1 * | 6/2001 | Miller ......................... 174/74 R |
| 6,326,550 B1 | 12/2001 | Dyer et al. |

(Continued)

FOREIGN PATENT DOCUMENTS

GB 2273398 6/1994

OTHER PUBLICATIONS

International Search Report and Written Opinion in connection with the corresponding International Application No. PCT/US2009/003396.

*Primary Examiner* — Charlie Peng
(74) *Attorney, Agent, or Firm* — Buchanan Ingersoll & Rooney PC

(57) ABSTRACT

A sealing gland system having an upper half, a lower half, and a sealing material positioned between the upper and lower halves. Each of the upper and lower halves and the sealing material has at least one opening extending therethrough, and wherein the sealing material forms a seal around at least one cable extending through the sealing material upon compression thereof.

20 Claims, 8 Drawing Sheets

U.S. PATENT DOCUMENTS

| | | |
|---|---|---|
| D461,452 S | 8/2002 | Yeh |
| D513,409 S | 1/2006 | Suckle |
| 7,114,727 B1 | 10/2006 | Goll |
| D543,156 S | 5/2007 | Suckle |
| 7,331,215 B2 | 2/2008 | Bond |
| D563,872 S | 3/2008 | Lee et al. |
| D574,785 S | 8/2008 | Victor |
| D593,954 S | 6/2009 | Lee et al. |
| 7,633,011 B2 | 12/2009 | Bolante |
| 7,705,240 B2 | 4/2010 | Armstrong et al. |

\* cited by examiner

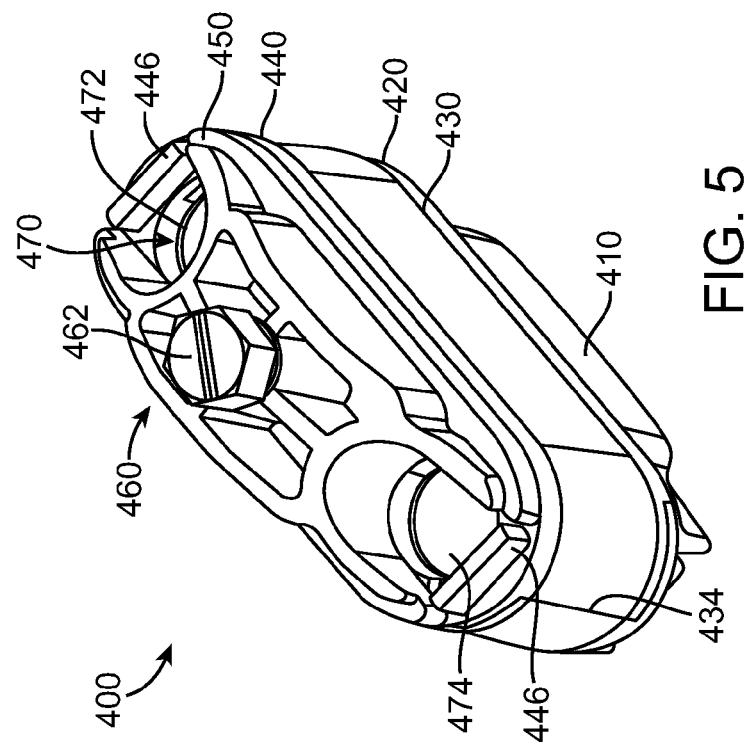
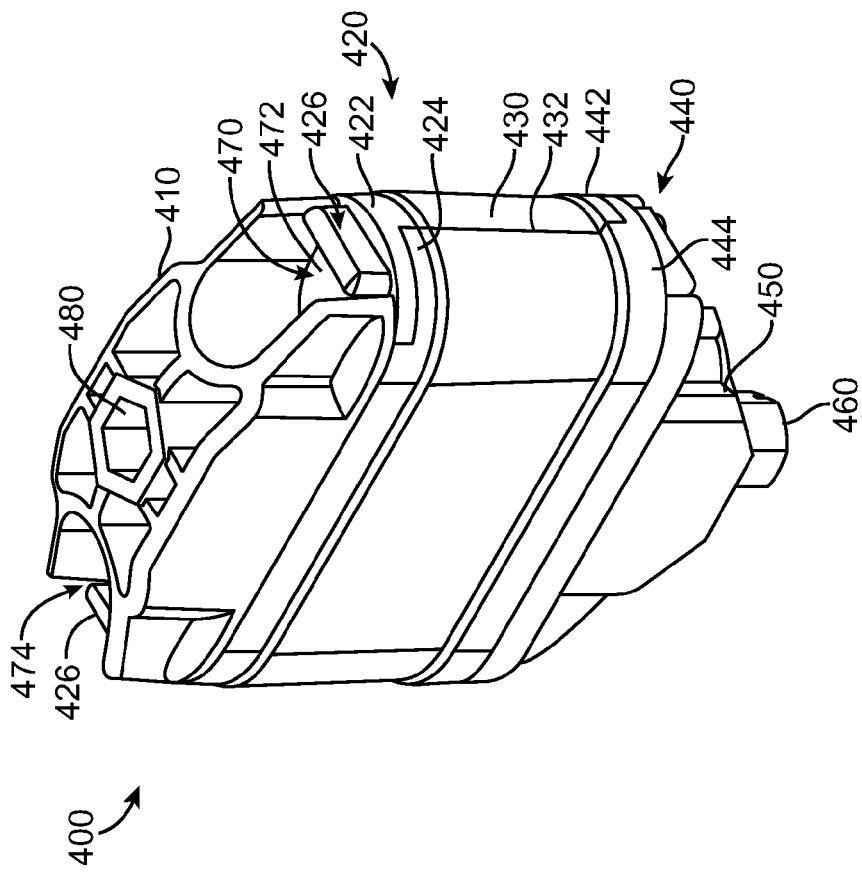

SEALING GLAND SYSTEM

FIELD OF THE INVENTION

This invention relates to a sealing gland system for telecommunication housings, enclosures, terminals, and more particularly to a sealing gland system for bracket mounted terminals (BMT) for use in the telecommunications industry.

BACKGROUND OF INVENTION

Telecommunication terminals (or terminal blocks) are typically used in the telecommunications industry to connect multiple wire pairs, for example, to connect telephone service wires to telephone company distribution cables. Such terminal blocks typically connect from 2 to 50 individual service wire pairs to the distribution cable that may have several thousand-wire pairs. Generally, the terminal block is spliced to the distribution cable through a splicing cable or stub cable that forms part of the telecommunication terminal or terminal block. The customer service wires are then connected to the telecommunication terminal or terminal block through some type of terminal, which, ideally, enables the service wires to be easily connected, disconnected and reconnected on site.

In the telecommunications industry, a large number of wires connect the various component of the system through the terminal block. To organize the wires, some telecommunications operators use color-coding on the wire jackets based on signal type, and channel number or program content. For example, telephone-wiring applications use a uniform scheme for dealing with a large number of wires for the telephone industry. The scheme uses two color codes—one for large numbers of wires organized in pairs and the other for smaller numbers of wires that also can be organized in pairs. For large number of wires, each pair is assigned a two-color code. The colors are selected from two groups of five, resulting in what is called a binder-group of 25 pairs. The colors used for a group are white, red, black, yellow and violet. The colors used for "pairs within a group" are blue, orange, green, brown and slate. Each pair must have a unique color combination. One wire within each pair has a solid background of its group color and stripes of the "pair within the group" color; the second wire has the colors reversed. Cables with more than 25 pairs of wires are constructed from 25-pair groups.

Alternatively, for small wiring groups, such as wires for an individual telephone station or terminal, a second color-code scheme can be used. The alternate color uses the first three pairs of the standard color code (white-blue, blue-white, and so on) or alternatively can use the six alternate color wires. Originally, telecommunications terminals were optimized for use with copper drop wires. Through an evolutionary process, a plurality of different wire sizes and kinds of wire have been employed to connect the subscriber to the phone company. The gauges can vary from 18½ to 26 AWG gauge copper based wires some of which may have steel cores. However, most common copper wires are between about 19-24 AWG gauge.

Recently, however, traditional copper wires are being replaced with optical fibers (i.e., fiber), instead of copper wires. For example, optical fibers can be used by a telecommunication company to transmit telephone signals, Internet communication, and/or cable television signals. In the past, due to difficulties including lack of infrastructure development within cities, and the complexity and expensive of fiber optic system, fiber-optic communication systems have primarily been installed in long-distance applications, where they can be used to their full transmission capacity, and offsetting the increased cost.

However, it can be appreciated that since many of these difficulties are starting to be overcome, optical fibers are being used as a medium for telecommunication and networking, and especially for long-distance communications. One advantage of optical fibers is that light propagates through the fiber with little attenuation compared to electrical cables, which allows long distances to be spanned with few repeaters. Additionally, the light signals propagating in the fiber can be modulated at rates as high as 40 Gb/s (Gigabits per second), such that each fiber can carry several independent channels, each by a different wavelength of light (wavelength-division multiplexing). In addition, over short distances, such as networking within a building, optical fiber can save space in cable ducts because a single fiber can carry much more data than a single electrical cable. It can be appreciated that optical fibers are also immune to electrical interference, which prevents cross-talk between signals in different cables and pickup of environmental noise. In addition, because fiber cables are non-electrical, fiber cables can bridge very high electrical potential differences and can be used in environments where explosive fumes are present, without danger.

Accordingly, what is needed is a telecommunication terminal, which incorporates a sealing gland system, which is essentially tool-less, such that a field technician does not require anything more than a screw driver and/or wrench.

SUMMARY OF THE INVENTION

In one aspect of the invention, a sealing gland system comprises: an upper half; a lower half; a sealing material positioned between the upper and lower halves; and at least one opening extending through the upper half, the sealing material and the lower half, wherein the sealing material forms a seal around at least one cable extending therethrough upon compression of the sealing material.

In a further aspect of the invention, a terminal system comprises: a base having a plurality of openings, each of the openings adapted to receive a sealing gland; at least one sealing gland; at least one splice tray; and a housing, which is placed over the at least one splice tray.

In another aspect of the invention, a terminal system comprises: a terminal block having at least one splice tray configured to receive an optical cable; a base having a plurality of openings, each of the openings adapted to receive a sealing gland; at least one sealing gland; and a housing, which is placed over the at least one splice tray and fits on an outer edge of the base.

In a further aspect of the invention, a method of sealing a cable within an enclosure, the method comprises the steps of: forming a loop on one end of the cable, and an entry cable and an exit cable on the other end of the cable; positioning the cable within a first sealing gland, the first sealing gland having a pair of slots configured to receive the cable; placing the first sealing gland within an opening of a base unit from an underside thereof; and compressing a sealing material within the first sealing gland around the distribution cable and outward against an inner surface of the opening within the base unit.

The above aspects of this invention are more fully explained in reference to the drawings and general disclosure herein.

BRIEF DESCRIPTION OF THE DRAWINGS

The invention will now be described in greater detail with reference to the preferred embodiments illustrated in the accompanying drawings, in which like elements bear like reference numerals, and wherein:

FIG. 4 is a perspective view a sealing gland in accordance with one embodiment.

FIG. 5 is a perspective view the sealing gland of FIG. 4 from a different perspective.

DETAILED DESCRIPTION OF THE INVENTION

With reference to the drawings, a sealing gland system for a telecommunication terminal system according to the present invention will now be described.

Figure 1:
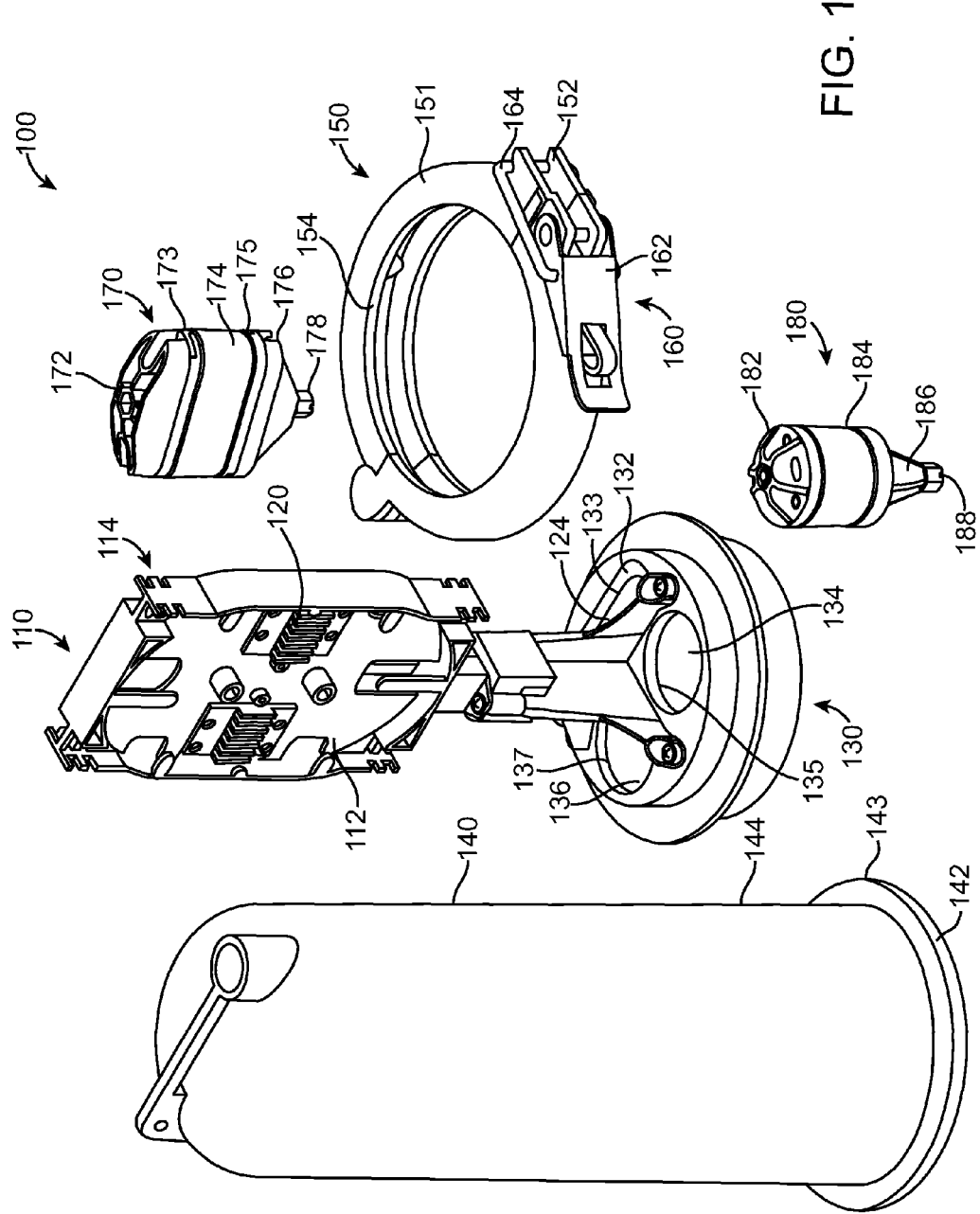
FIG. 1 is a perspective view of a telecommunication terminal system in accordance with one embodiment.

FIG. 1 is a perspective view of a telecommunication terminal system 100 in accordance with an embodiment. As shown in FIG. 1, in accordance with an exemplary embodiment, the telecommunication terminal system 100 (e.g., bracket mounted terminal or "BMT") includes an organizer or terminal block 110, and at least one splice or fiber tray 120, which is attachable to a base unit 130. The system 100 also includes a housing or dome enclosure 140, a lockable sealing unit 150 having a bracket or hinge clamp 160, which seals the base unit 130 to the housing 140, and at least one sealing gland 170, 180. In accordance with an exemplary embodiment, the telecommunication terminal system 100 is configured to accommodate various organizers or terminal blocks 110 and base units 130, such as a bracket mounted terminal system (BMT) as manufactured and sold by Channell Commercial Corporation of Temecula, Calif.

As shown in FIG. 1, the organizer or terminal block 110 has at least one splice or fiber tray 120, which is attachable to the base unit 130. In accordance with an exemplary embodiment, the organizer or terminal block 110 is an injected molded organizer or terminal block 110. The organizer or terminal block 110 is preferably attached to the base unit with a series of threaded screws or other suitable fasteners. In accordance with an exemplary embodiment, the organizer or terminal block 110 is a fiber organizer. Alternatively, in accordance with another embodiment, the organizer or terminal black 110 and the base unit 130 can be manufactured or molded as a single unit. The organizer or terminal block 110 has a first or front side 112, which receives the at least one splice or fiber tray 120, and a second or back side 114. In accordance with a preferred embodiment, the at least one splice or fiber tray 120 has series of prongs or other suitable fasteners 122 (FIG. 3), which are configured to fit within a plurality of splice tray openings 116 (FIG. 3) within the organizer or terminal block 110.

In accordance with an exemplary embodiment, the organizer or terminal block 110 includes a plurality of fiber trays 120, and more preferably a plurality of thermoplastic fiber trays 120. In accordance with an exemplary embodiment, each tray 120 is configured to hold 12 fibers, which provides a simple design for cost effective low and mid-sized fiber splicing applications. The fiber trays 120 are preferably modular in design, such that the trays 120 can be snapped together as cassettes to create neatly organized splice configurations of up to 96 fibers. In addition, the trays 120 are configured to receive a fiber cable 220 (FIG. 2), wherein the fiber cables 220 can be slotted core, a tubed, and/or tight buffered type fiber cables 220. In accordance with an embodiment, when necessary to split individual fibers from the same cable (or tube) onto a different tray 120, each of the fibers can be routed from one side 112 of the tray to the other side 114. In addition, each tray 120 is supplied with splice holders 242 (FIG. 2) that secures and protects both fusion and/or mechanical type splices. It can be appreciated that each of the trays 120 can be equipped with a standard transparent protective cover, or a fully hinged solid plate for protection of the stored fibers and splices.

In accordance with an alternative embodiment, each of the fiber trays 120 can be designed to provide cable management, storage and protection for splicing applications. For example, each of the fiber trays 120 can be modular in design and engineered such that the trays 120 can be snapped together as cassettes to create a neatly organized splice configurations of up to 96 fibers. In accordance with an embodiment, each tray 120 is hinged permitting access to any tray 120 without disrupting other trays 120. For example, a "figure-8" style storage unit can be used, which provides for improved storage and access to fibers. In accordance with another embodiment, fiber entry/access points are provided in all four corners of the trays 120 along with a protective cover. In addition, each tray 120 is supplied with splice holders 242 that secure and protect both fusion and/or mechanical splices 240.

In accordance with an alternative embodiment, a plurality of multi-purpose splice trays 120 can used, which provide easy access and versatile storage for single fusion, mass fusion and/or mechanical splices. For example, in accordance with an embodiment, the multi-purpose splice tray 120 can be comprised of a plurality of side-hinged stackable trays, which allow customized placement of modular splice blocks and fiber raceways.

The base unit 130 has a plurality of openings 132, 134, 136, each of the openings (or through holes) 132, 134, 136 adapted to receive a sealing gland 170, 180. Each of the plurality of openings (or through holes) 132, 134, 136 is configured to receive a sealing gland 170, 180 having either a round or an oval outer diameter and/or shape. The openings (or through holes) 132, 134, 136 each include an inner diameter 133, 135, 137 configured to receive the sealing gland 170, 180. It can be appreciated that the shape or inner diameter 133, 135, 137 of each of plurality of openings (or through holes) 132, 134, 136 will be the same as the outer diameter of the sealing glands 170, 180 (i.e., round with round and oval with oval). In accordance with an exemplary embodiment, the base unit 130 has two round openings (or through holes) 134, 136 and one oval opening (or through hole) 132.

It can be appreciated that each of the openings 132, 134, 136 is configured to receive either a sealing gland 170, 180 and/or a plug (i.e., a dummy plug (not shown)), which can be used instead and place of a sealing gland 170, 180. The plug or dummy plug fills the opening such that the opening is airtight and watertight, and providing an enclosure portion for the organizer and/or terminal block 110.

In accordance with an exemplary embodiment, the housing or dome enclosure 140 is preferably an airtight and watertight housing or dome enclosure, which is placed over the terminal block 110 to provide an airtight and watertight housing for the terminal block 110. The housing 140 has a base 142 having an outer rim or edge 143, and an enclosure portion 144. In accordance with an exemplary embodiment, the housing 140 is preferably a high impact, UV resistant thermoplastic material, which is resistant to corrosive environments, which can be used for buried, underground, marina and aerial applications.

The lockable sealing unit (or clamp) 150 has a bracket or hinge clamp 160, which seals the base unit 130 to the housing 140. In accordance with an embodiment, the bracket or hinge clamp 160 is a stainless steel (preferably L-shaped) bracket or hinge clamp, which assists with the positioning of the terminal block 110 (or electrical terminal) within the housing or domed closure 140. As shown in FIG. 1, the lockable sealing unit 150 includes a two piece hinged portion 151 having a pairs of hinge receiving portions 152, which are configured to engage a fastener, preferably comprised of a hinge clamp 160. The hinge clamp 160 includes a handle portion 162 and a locking hinge portion 164. The two piece hinged portion 151 has an inner groove 154, which is configured to fit around the outer rim or edge 143 of the base 142 of the housing 140.

Figure 2:
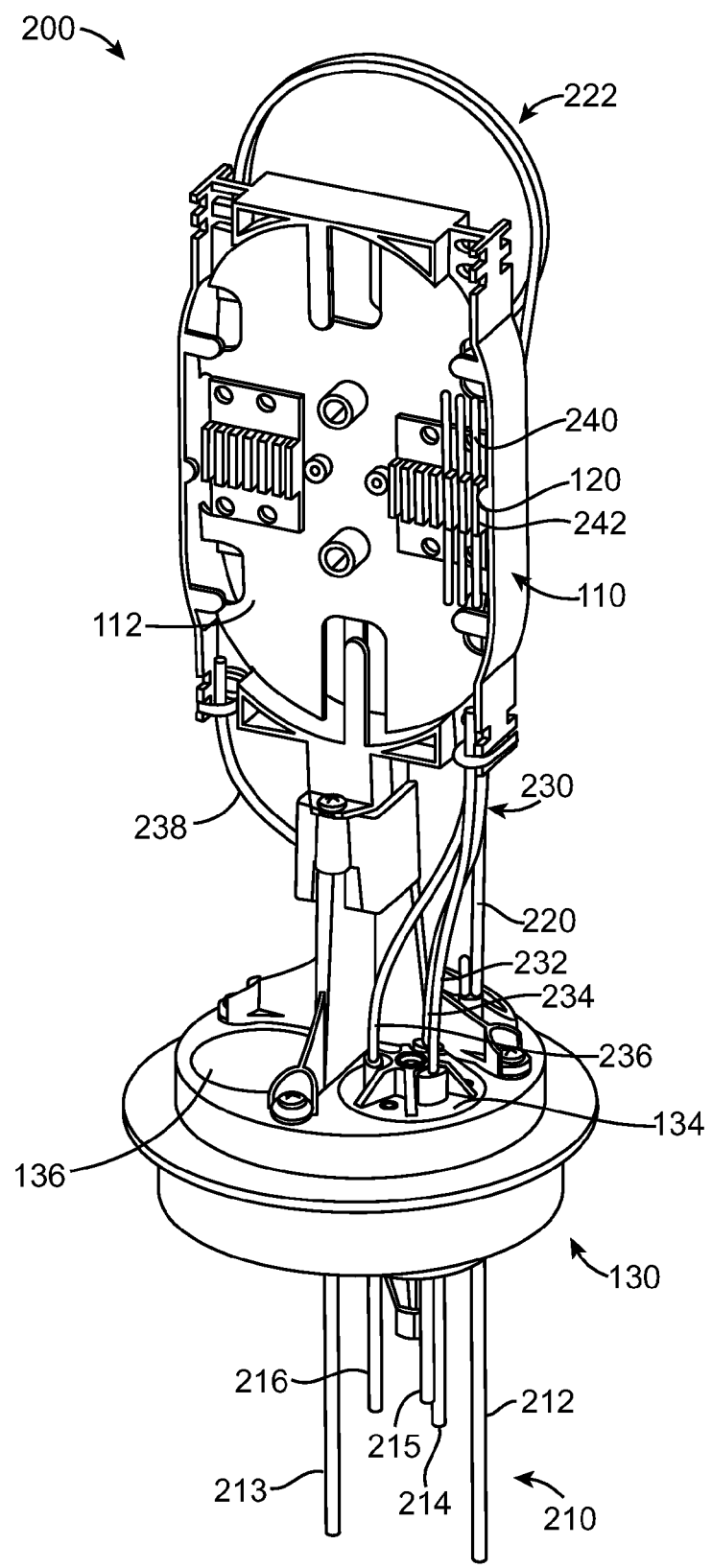
FIG. 2 is a perspective view of a portion of a telecommunication terminal system in accordance with an embodiment.

In accordance with an exemplary embodiment, the at least one sealing gland 170, 180 can be an oval sealing gland 170, which is configured to receive fiber or copper cables 220 (FIG. 2) and/or a round sealing gland 180, which is configured to receive drop wires and/or cables 230 (FIG. 2). The oval sealing gland 170 is comprised of an upper half 172, a lower half 174, and a sealing material or membrane 174 positioned between the upper and lower halves 172, 176, and wherein the sealing material or membrane 174 forms a seal around at least one cable 220 extending therethrough upon compression of the sealing material 174. It can be appreciated that an oval sealing gland 170 is able to fit within a smaller narrower housing, as compared to a round or circular sealing gland. In addition, by being able to fit within smaller narrower housings, one advantage of an oval sealing gland 170 is that the oval sealing gland 170 allows for smaller housings, enclosures, and/or terminals, especially when space and/or real estate is at a premium.

In accordance with an exemplary embodiment, the oval sealing gland 170 also includes a pair of pressure plates 173, 175, which are positioned between the upper half 172 or lower half 176 and the sealing material or membrane 174. The round sealing gland 180 also includes an upper half 182, a lower half 186, and a sealing material 184 positioned between the upper and lower halves 182, 186, and wherein the sealing material 184 forms a seal around at least one cable or drop wire 230 extending therethrough upon compression of the sealing material 184.

FIG. 2 is a perspective view of a portion of a telecommunication terminal system 200 in accordance with an exemplary embodiment. As shown in FIG. 2, the telecommunication terminal system 200 includes an organizer or terminal block 110, and at least one splice or fiber tray 120, which is attachable to a base unit 130. In accordance with a preferred embodiment, each tray 120 has a plurality of splice holders 242 that can secure and/or protect both fusion and/or mechanical splices 240.

In accordance with an exemplary embodiment, the terminal system 200 includes a plurality of cables 210, which preferably include at least one copper or fiber input (or entry) distribution cable 212, at least one copper or fiber output (or exit) distribution cable 213 and at least one drop wire or cable 214, 215, 216. Typically, the distribution cables 212, 213 are connected to a central office or other suitable distribution center. The terminal system 200 is spliced to the distribution cable 212 through a splicing cable or stub cable 220 that forms part of the telecommunication terminal system 200.

The at least one drop wire or cable 214, 215, 216, (or customer service wires) is then connected to the telecommunication terminal 200 through some type of organizer or terminal block 210, which, ideally, enables the drop wire 214, 215, 216 (service wires) to be easily connected, disconnected and reconnected on site. The organizer or terminal block 110 preferably can connect from 2 to 50 individual service wire pairs to the distribution cable 212 that may have several thousand-wire pairs.

The splicing cable 220 extends upward into the housing 140 of the terminal system 200 and can include additional cable (aka slack cable) 222, which is stored in the upper portion of the housing 140. The splicing cable 220 extends through an opening or port within the oval gland 170 to an outer portion of the terminal system 200 in the form of an outlet or exit distribution cable 213, which is typically connected to another telecommunication terminal system. The distribution cables 212, 213 preferably include a heavy or thick outer jacket or sheath of polymeric material.

In accordance with an exemplary embodiment, the system 100 allows for the distribution cables 212, 213 (i.e., the entry and exit cables) to be brought or placed within attached to the organizer or terminal block 110, and/or the at least one splice or fiber tray 120 without have to cut or splice the distribution cable 212 (i.e., entry). In accordance with an exemplary embodiment, the plurality of cables 210, and more specifically the distribution cables 212, 213 are placed within the oval sealing gland 170 through a series of slots or slits within the oval sealing gland 170.

The oval sealing gland 170 is then inserted or placed within the opening or port 132 of the base unit 130 from the underside, which allows the distribution cables 212, 213 to be spliced and/or connected to the terminal block 110 and/or the at least one splice tray 120 without the need to cut or splice the distribution cables 212, 213. Once the distribution cables 212, 213 are placed or inserted into the upper portion of the system 100, the sealing material or membrane 174 of the sealing gland 170 expands into the inner diameter of the opening or port 132 sealing the inner diameter 133 of the system 100 from the outer elements, and providing an airtight and watertight enclosure.

It can be appreciated that as used herein a cable 210, 212, 213, 214, 215, 216, 220, 222, 230 can be one or more wires or optical fibers (not shown) bound together in a common protective jacket or sheath. In accordance with an embodiment, each of the optical fibers is individually coated with a plastic layer (or cladding) and contained in a protective tube suitable for the environment in which the optical fibers are deployed. For example, in practical fibers, the cladding is usually coated with a tough resin buffer layer, which may be further surrounded by a jacket layer, usually plastic. The resin buffer and jacket layers add strength to the fiber but do not contribute to its optical wave guide properties. In accordance with another embodiment, a rigid fiber assembly can include light-absorbing ("dark") glass between the fibers, to prevent light that leaks out of one fiber from entering another, which can reduce cross-talk between the fibers, or reduce flare in fiber bundle imaging applications.

For example, in an indoor application, the jacketed fiber is generally enclosed, with a bundle of flexible fibrous polymer strength members like Aramid (e.g. Twaron or Kevlar), in a lightweight plastic cover to form a simple cable. Each end of the cable may be terminated with a specialized optical fiber connector to allow the cable to be easily connected and disconnected from transmitting and receiving equipment.

In accordance with another embodiment, in more strenuous environments, a much more robust cable construction is often required. For example, in a loose-tube construction the fiber is laid helically into semi-rigid tubes, allowing the cable to stretch without stretching the fiber, which protects the fiber from tension during laying and due to temperature changes. Alternatively, the fiber can be embedded in a heavy polymer jacket, commonly called a "tight buffer" construction. These fiber units are commonly bundled with additional steel strength members, again with a helical twist to allow for stretching.

It can also be appreciated that each of the individual optical fibers in a fiber-optic cable can be distinguished from one another by color-coded jackets or buffers on each fiber. For example, one identification scheme used for fiber-optic cables is based on EIA/TIA-598, "Optical Fiber Cable Color Coding." EIA/TIA-598 defines identification schemes for fibers, buffered fibers, fiber units, and groups of fiber units within outside plant and premises optical fiber cables, which allows for fiber units to be identified by means of a printed legend. Thus, in the preferred embodiments of the invention, the organizer or terminal block 110 alone, or when connected to a module, is weatherproof as defined by the majority, if not all, of the preceding weather related tests for use in harsh outside or buried environments.

In addition, combination cables may contain both electrical wires and optical fibers. In accordance with another exemplary embodiment, the cables 210, 212, 213, 214, 215, 216, 220, 222, 230 can be comprised of a plurality of electrical wires, which are preferably copper because of copper's excellent conductivity, however, aluminum or other suitable conductive material can be used.

Figure 3:
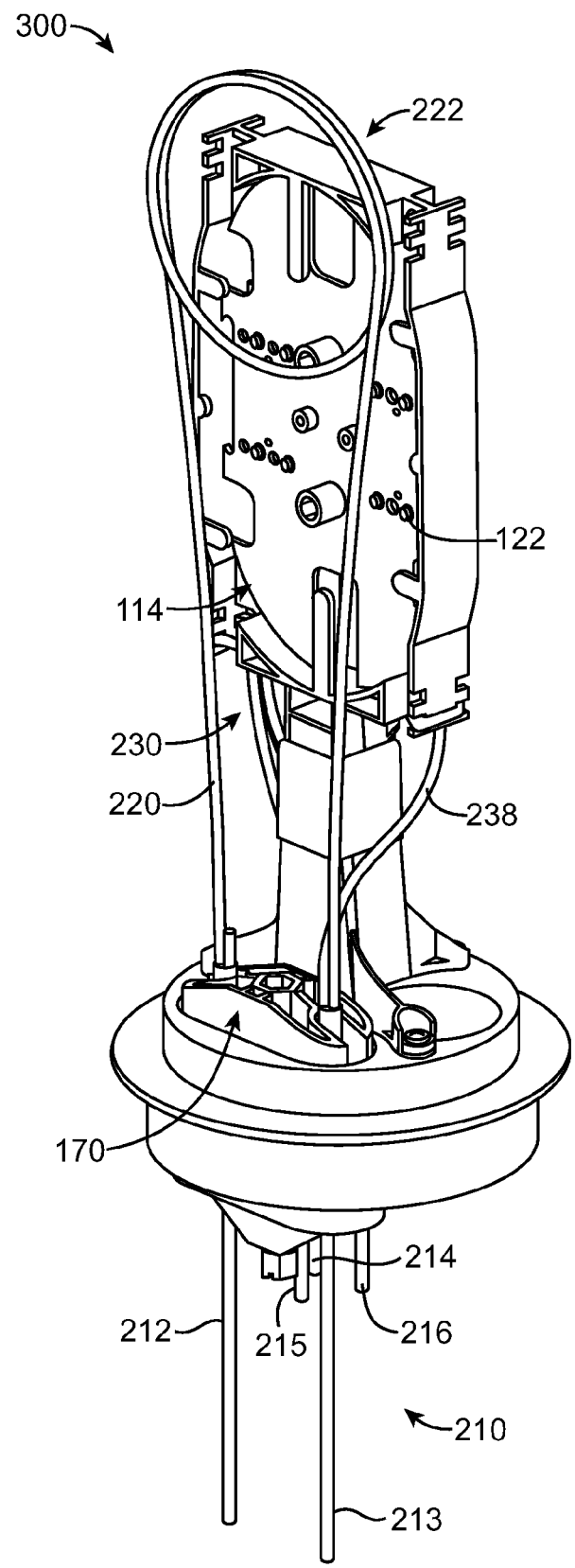
FIG. 3 is a perspective view of a portion of a telecommunication terminal system in accordance with another embodiment.

FIG. 3 is a perspective view of a portion of a telecommunication terminal system 300 in accordance with another embodiment. As shown in FIG. 3, the terminal system 300 includes an organizer or terminal block 110, at least one splice tray 120, a base unit 130, a distribution cable, at least one drop wire, and a splice cable 220. The plurality of cables 210, which preferably includes at least one copper or fiber input distribution cable 212, and the at least one copper or fiber output distribution cable 213 extend though the oval sealing gland 170. The terminal system 200 is spliced to the distribution cable 212 through a splicing cable or stub cable 220 that forms part of the telecommunication terminal system 200.

FIG. 4 is a perspective bottom view of a sealing gland 400 in accordance with one embodiment. As shown in FIG. 4, the sealing gland 400 includes an upper half or portion 410, a lower half or portion 450, and a sealing material or membrane 430 positioned between the upper and lower halves or portions 410, 450. The sealing material or membrane 430 forms a seal around at least one cable (not shown) extending therethrough upon compression of the sealing material 430. The sealing gland 400 also includes at least one opening 470 extending through the upper half 410, the sealing material 430 and the lower half 450 for the at least one cable to extend therethrough, and a second opening or bore extending through the upper half 410, the sealing material 430 and the lower half 450 for a threaded screw or bolt 460.

In accordance with a preferred embodiment, the at least one opening 470 preferably comprises a first opening 472 and a second opening 474, which are configured to receive an entry or input distribution cable 212 and an exit or outlet distribution cable 213. The sealing material or membrane 430 also includes a pair of slits (or slots) 432, 434 on an outer edge of the sealing material or membrane 430, which is configured to receive the distribution cables 212, 213 (i.e., entry and exit cables). The slits (or slots) 432, 434 extend from the outer edge to one of the plurality of bores or through holes (not shown) within the sealing material or membrane 430. During installation, the distribution cable 210 forms a loop on one end of the cable 210 and an entry and an exit cable 212, 213 on the other end of the cable 210. The entry and exit portions 212, 213 of the distribution cable 210 are then placed within the oval sealing gland 170 through a series of slot or grooves 432, 434 within an outer portion of the oval sealing gland 170. The loop portion of the distribution cable 212, 213 can then be placed though the opening (or through hole) 132 of the base unit 130 and extending into the enclosure portion of the system 100. The sealing gland 170 can then placed within the opening (or through hole) 132 of the base unit 130. The upper half or portion 410 and the lower half or portion 450 are compressed towards one another, such that the sealing material 430 seals around the entry and exit cables 212, 213 and extends outward against an inner surface 132 of the opening with the base unit 130. In accordance with an exemplary embodiment, the sealing gland 170 seals and/or fits within the opening (or through hole) 132 in an airtight and watertight manner.

In accordance with an exemplary embodiment, the sealing material or membrane 430 is comprised of a soft rubber or rubber-like material, which can include elastic hydrocarbon polymeric materials, synthetic materials and/or polymeric materials. In accordance with an exemplary embodiment, the sealing material or membrane 430 has a Durometer of approximately 15 to 70 Shore (Type A) and more preferably about 25 to 55 Shore (Type A).

In accordance with another embodiment, the sealing gland 400 also includes an upper plate (or an upper split pressure plate) 420 and a lower plate (or lower split pressure plate) 440, each of the upper and the lower plates 420, 440 having an opening for an entry cable 212 and an exit cable 213. The upper and lower plates 420, 440 are positioned between the upper half 410 and the sealing material or membrane 430, and the lower half 450 and the sealing material or membrane 430, respectively. In accordance with an exemplary embodiment, the upper and lower plates 420, 440 each include a first half 422, 442 and a second half 424, 444, which are essentially minor images of one another, with reciprocating portions, which are configured to align the two halves 422, 442, 424, 444 with one another. In accordance with an exemplary embodiment, each of the pressure plates 420, 440 also preferably include a pair of guide ridges 426, 446 on an outer portion of each of the upper and lower plates 420, 440.

Each of the plates 410, 420, 440, 450 and the sealing material or membrane 430 also has at least one opening or bore 480, which is configured to receive a threaded screw or bolt 460 for compressing the sealing material or membrane 430 during use of the oval sealing gland 400 to create an airtight and watertight seal around the at least one cable 210, 212, 213, 214, 215, 216, 220, 222, 230.

FIG. 5 is a perspective view the sealing gland 400 of FIG. 4 from a different perspective. As shown in FIG. 5, the sealing gland 400 includes a includes an upper half or portion 410, a lower half or portion 450, and a sealing material or membrane 430 positioned between the upper and lower halves or portions 410, 450. The sealing gland 400 also includes at least one opening 470 extending through the upper half 410, the sealing material 430 and the lower half 450 for the at least one cable 210, 212, 213, 214, 215, 216, 220, 222, 230 to extend therethrough, and a second opening or bore 480 extending through the upper half 410, the sealing material 430 and the lower half 450 for a threaded screw or bolt 460. In accordance with an exemplary embodiment, the threaded screw or bolt 460 has a screw head 462 configured to optionally receive a slotted screw driver, a Phillips head, Allen (or hex) wrench or other suitable hand tool or screw head type device. In accordance with a preferred embodiment, the at least one opening 470 preferably comprises a first opening 472 and a second opening 474, which are configured to receive an entry or input distribution cable 212 and an exit or outlet distribution cable 213.

In accordance with another embodiment, the sealing gland 400 also includes an upper plate (or an upper split pressure plate) 420 and a lower plate (or lower split pressure plate) 440, each of the upper and the lower plates 440 having an opening for an entry cable 212 and an exit cable 213. The upper and lower plates 420, 440 are positioned between the upper half 410 and the sealing material or membrane 430, and the lower half 450 and the sealing material or membrane 430, respectively. In accordance with an exemplary embodiment, the upper and lower plates 420, 440 each include a first half 422, 442 and a second half 424, 444, which are essentially mirror images of one another, with reciprocating portions, which are configured to align the two halves 422, 442, 424, 444 with one another. Each of the pressure plates 420, 440 also preferably include a pair of guide ridges 426, 446 on an outer portion of each of the upper and lower plates 420, 440.

Figure 6:
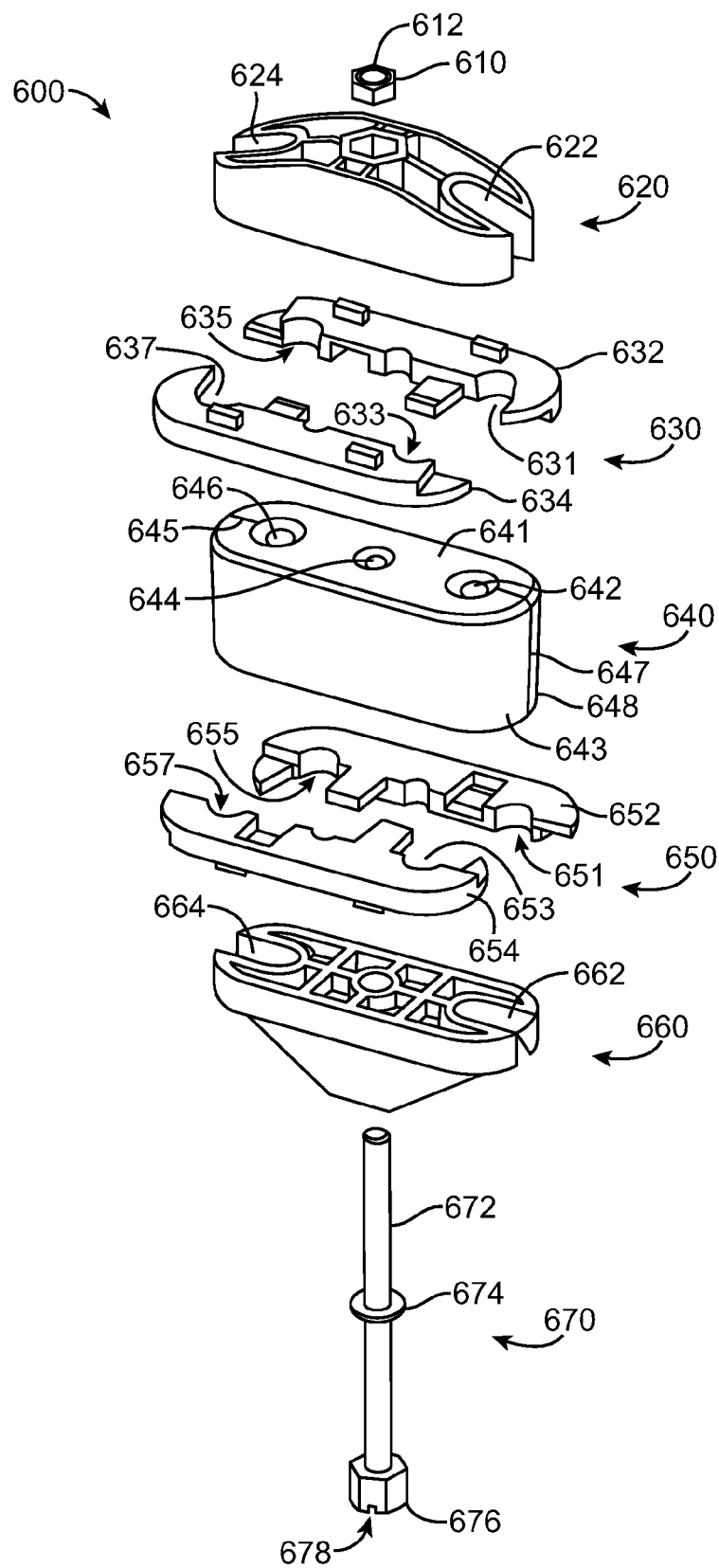
FIG. 6 is an exploded view of a sealing gland in accordance with an embodiment.

FIG. 6 is an exploded view of a sealing gland 600 in accordance with an exemplary embodiment. As shown in FIG. 6, the sealing gland 600 includes an upper half or portion 620, a lower half or portion 660, and a sealing material or membrane 640 positioned between the upper and lower halves or portions 620, 660. The sealing material or membrane 640 forms a seal around at least one cable (not shown) extending therethrough upon compression of the sealing material 640. The sealing gland 600 also includes at least one opening 680 extending through the upper half 620, the sealing material 640 and the lower half 660 for the at least one cable to extend therethrough, and a second opening or bore 682 extending through the upper half 620, the sealing material 640 and the lower half 660 for a threaded screw or bolt 670 and a fastener 610 with a thread hole or internal screw thread 612. The threaded screw or bolt 670 can include an axial shaft 672 having a thread on at least a portion thereof, a washer 674, a screw head 676 and optionally a slot or other configuration 678, which receives a slotted screw driver, a Phillips head, Allen (or hex) wrench or other suitable hand tool or screw head type device.

The sealing gland 600 also includes an upper plate (or an upper split pressure plate) 630 and a lower plate (or lower split pressure plate) 650, each of the upper and the lower plates 630, 650 having an opening for an entry cable and an exit cable. As shown, the upper and lower plates 630, 650 are positioned between the upper half 620 and the sealing material or membrane 640, and the lower half 660 and the sealing material or membrane 640, respectively. In accordance with an exemplary embodiment, the upper and lower plates 630, 650 each include a first half 632, 652 and a second half 634, 654, which are essentially minor images of one another, with reciprocating portions, which are configured to align the two halves 632, 634, 652, 654 with one another.

In accordance with an exemplary embodiment, the sealing material or membrane 640 includes a plurality of bores or holes 642, 644, 646, each of which extends from an upper surface 641 to a lower surface 643 of the sealing material or member 640. The plurality of cables 210, and more specifically the distribution cables 212, 213 are placed within the oval sealing gland 170 through a pair of slits (or slots) 645, 647 on an outer edge of the sealing material or membrane 640 of the sealing gland 600. The slits (or slots) 645, 647 within the sealing material or membrane 640 extend from the outer edge to one of the plurality of bores or through holes 642, 646. It can be appreciated that the slits (or slots) 645, 647 within the sealing material or membrane 640 can be essentially vertical or alternatively, the slits (or slots) 645, 647 can be angled or on a slight diagonal. The slits (or slots) 645, 647 preferably extend from the upper surface 641 to the lower surface 643 of the sealing material or membrane 640. It can be appreciated that in accordance with an exemplary embodiment, the slits (or slots) 645, 647 allow the uncut entry and exit cable/distribution cables 212, 213 to be placed within the enclosure or upper portion of the system 100 without having to cut and/or splice the entry (input) or exit (output) cables 212, 213.

In accordance with an exemplary embodiment, the sealing material or membrane 640 is comprised of a soft rubber or rubber-like material 648, which can include elastic hydrocarbon polymeric materials, synthetic materials and/or polymeric materials. In accordance with an exemplary embodiment, the sealing material or membrane 640 has a Durometer of approximately 15 to 70 Shore (Type A) and more preferably a Durometer of about 25 to 55 Shore (Type A).

In addition, each of the plates 620, 630, 650 and 660 are configured to allow an exit and an entry cable. For example, the upper half or portion 620 and the lower half or portion 660 can include a pair of cutouts 622, 624, 662, 664, which provide a slot, which receives the entry and exit cables/distributions cables 212, 213. Each of the pressure plates 630, 650 has a plurality of cutouts 631, 633, 635, 637, 651, 653, 655, 657, which form a pair of slots or openings within each the pressure plates 630, 650, and which are configured to receive the entry and exit cables/distribution cables 212, 213.

Figure 7:
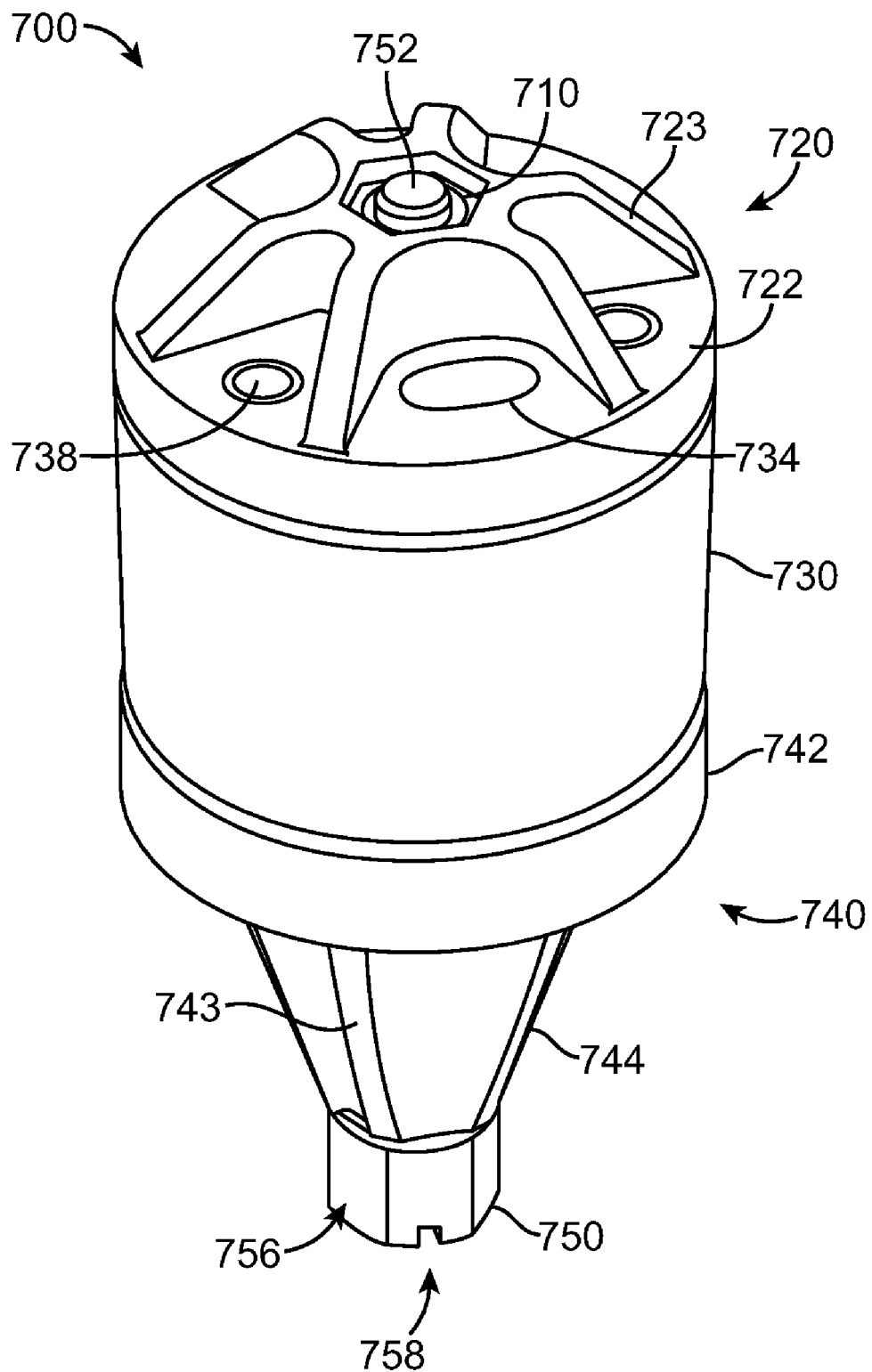
FIG. 7 is a perspective view of a sealing gland in accordance with another embodiment.

FIG. 7 is a perspective view of a sealing gland 700 in accordance with another embodiment. As shown in FIG. 7, the sealing gland 700 includes an upper plate 720, a lower plate 740, and an sealing material or membrane 730 positioned between the upper and lower plates 720, 740. The sealing gland 700 also includes a threaded screw or bolt 750 and a fastener 710 with a thread hole or internal screw thread. The threaded screw or bolt 750 can include an axial shaft 752 having a thread on at least a portion thereof, a screw head 756 and optionally a slot or other configuration 758, which receives a slotted screw driver, a Phillips head, Allen (or hex) wrench or other suitable hand tool or screw head type device.

The upper and lower plates 720, 740 has a circular plate 722, 742 with a plurality of ridges 723, 743. The upper and lower plates 720, 740 also include a plurality of bores and/or openings 738, which are configured to receive a cable and/or wire from the organizer or terminal block. In accordance with an exemplary embodiment, the upper and lower plate 720, 740 include a plurality of round openings or bores 738 and a plurality of oval openings or bores 734. The plurality of bores and/or openings 734, 738 preferably number between 3 and 6. It can be appreciated that the upper and lower plates 720, 740 are preferably a molded plastic. However, other suitable material can be used. In accordance with an exemplary embodiment, the sealing material or membrane 730 is comprised of a soft rubber or rubber-like material, which can include elastic hydrocarbon polymeric materials, synthetic materials and/or polymeric materials.

Figure 8:
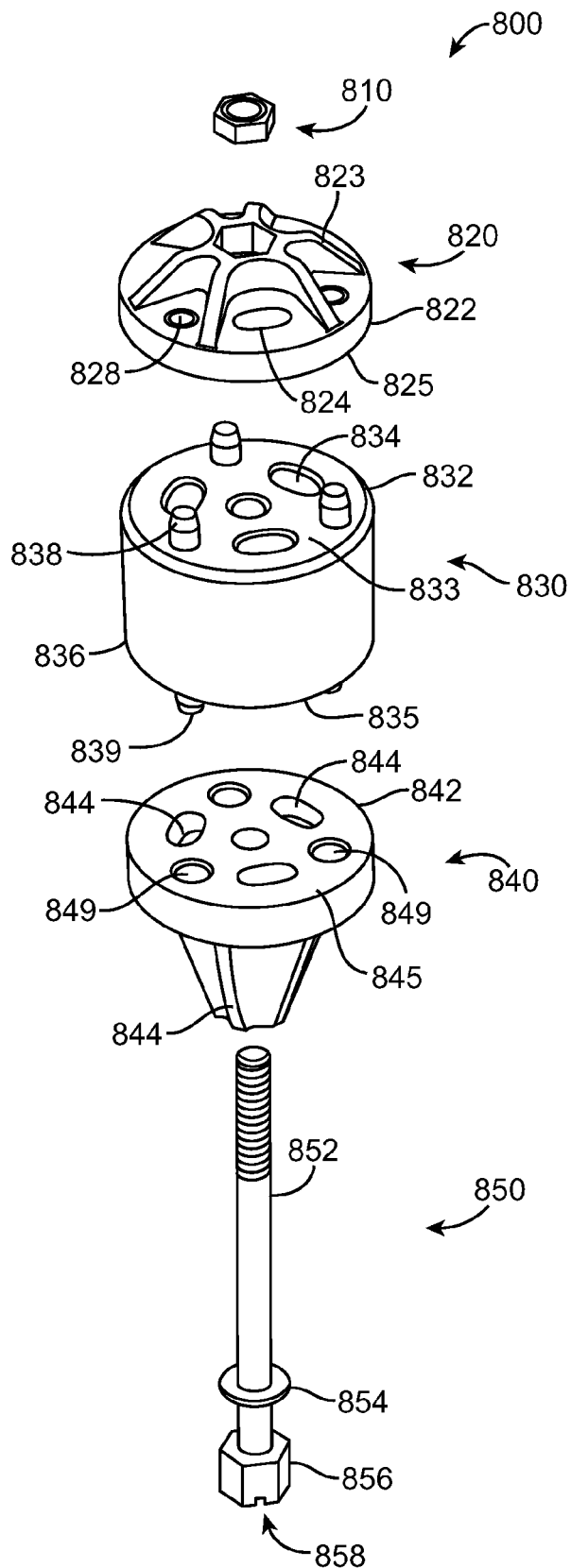
FIG. 8 is an exploded view of a sealing gland in accordance with a further embodiment.

FIG. 8 is an exploded view of a sealing gland 800 in accordance with a further embodiment. As shown in FIG. 8, the sealing gland 800 includes an upper plate 820, a lower plate 840, and an sealing material or membrane 830 positioned between the upper and lower plates 820, 840. The sealing gland 800 also includes a threaded screw or bolt 850 and a fastener 810 with a thread hole or internal screw thread. The threaded screw or bolt 850 can include an axial shaft 852 having a thread on at least a portion thereof, a screw head 856 and optionally a slot or other configuration 858, which is configured to receive a slotted screw driver, a Phillips head, Allen (or hex) wrench or other suitable hand tool or screw head type device.

The upper and lower plates 820, 840 are preferably circular plate 822, 842, which include a plurality of ridges 823, 843. In accordance with an exemplary embodiment, the upper plate and lower plate 820, 840 include a plurality of round or circular openings or bores 828, 849, which are configured to receive a plurality of guide members 838, 839 positioned on an upper or lower surface of the sealing material or membrane 830. It can be appreciated that the upper and lower plates 820, 840 are preferably a molded plastic. However, other suitable material can be used.

In accordance with an exemplary embodiment, the sealing material or membrane 830 is comprised of a soft rubber or rubber-like material, which can include elastic hydrocarbon polymeric materials, synthetic materials and/or polymeric materials. In accordance with an embodiment, the sealing material or membrane 830 includes a generally circular member 832 having a plurality of oval bores 834 configured to receive an entry cable or an exit cable from a organizer or terminal block. As shown in FIG. 8, the guide members 838, 839 are configured to fit within the plurality of round or circular openings or bores 828, 849. The guide members 838, 839 are 2 to 5 in number and more preferably 3 in number. The upper plate 820 and the lower plate 840 also include a plurality of oval openings or bores 824, 844, which are configured to receive a cable and/or wire from the organizer or terminal block. The plurality of bores and/or openings 834, 838 preferably number between 2 and 5, and more preferably 3 in number.

Figure 9:
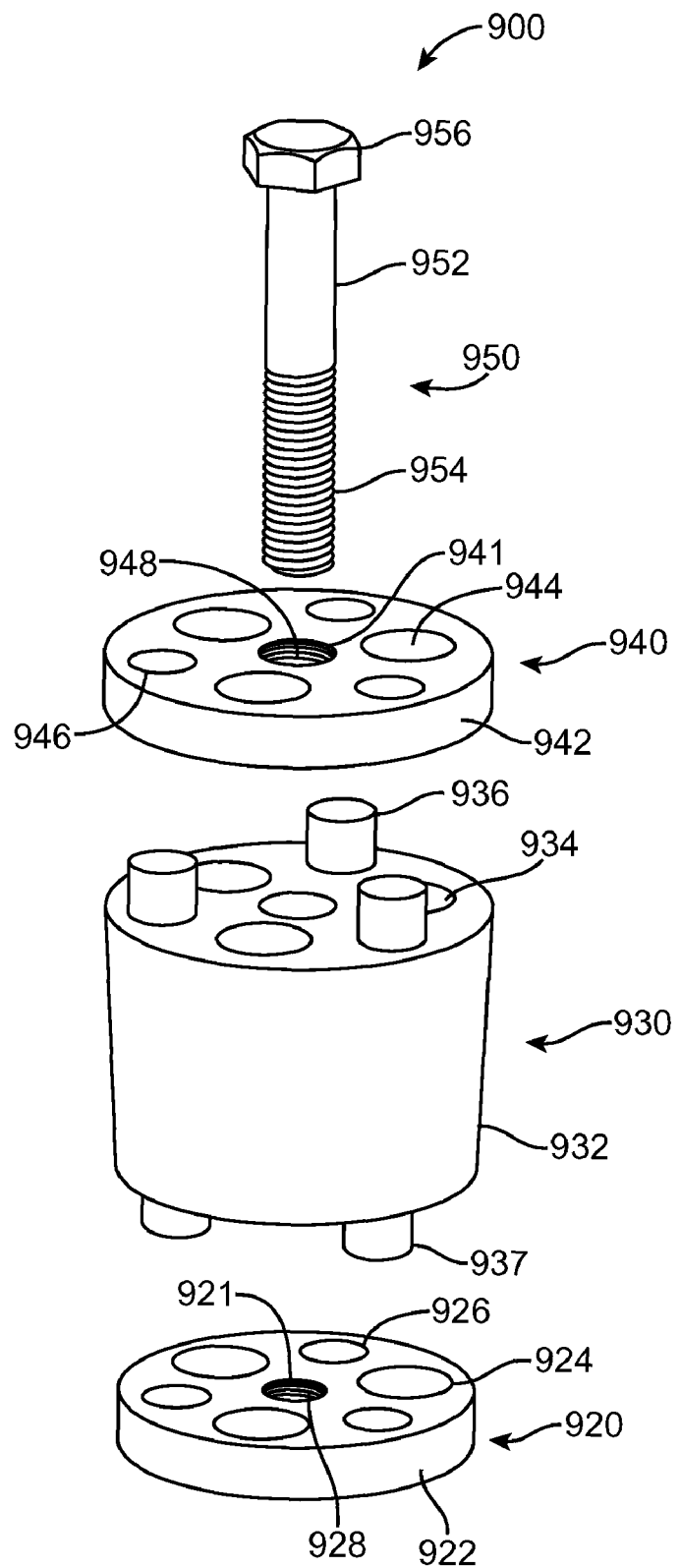
FIG. 9 is an exploded view of a sealing gland in accordance with another embodiment.

FIG. 9 is an exploded view of a sealing gland 900 in accordance with another embodiment. As shown in FIG. 9, the sealing gland 900 includes an upper plate 920, a lower plate 940, and an sealing material or membrane 930 positioned between the upper and lower plates 920, 940. The sealing gland 900 also includes a threaded screw or bolt 950 and a fastener (not shown) with a threaded hole or internal screw thread. The threaded screw or bolt 950 can include an axial shaft 952 having a thread on at least a portion thereof, a screw head 956. In accordance with an alternative embodiment, the screw head 956 can include a slot or other configuration, which is configured to receive a slotted screw driver, a Phillips head, Allen (or hex) wrench or other suitable hand tool or screw head type device.

In accordance with an exemplary embodiment, the upper and lower plates 920, 940 are circular plates 922, 942 having a plurality of round or circular openings or bores 926, 946, which are configured to receive a plurality of guide members 936, 937 positioned on an upper or lower surface of the sealing material or membrane 930. It can be appreciated that the upper and lower plates 920, 940 are preferably a molded plastic. However, other suitable materials can be used.

In accordance with an exemplary embodiment, the sealing material or membrane 930 is comprised of a soft rubber or rubber-like material, which can include elastic hydrocarbon polymeric materials, synthetic materials and/or polymeric materials. In accordance with an embodiment, the sealing material or membrane 930 includes a generally circular member 932 having a plurality of oval bores 934 configured to receive an entry cable or an exit cable from a organizer or terminal block. As shown in FIG. 9, the guide members 936, 937 are configured to fit within the plurality of round or circular openings or bores 926, 946. The guide members 936, 937 are 2 to 5 in number and more preferably 3 in number. The upper plate 920 and the lower plate 940 also include a plurality of oval or round openings or bores 924, 944, which are configured to receive a cable and/or wire from the organizer or terminal block. The plurality of bores and/or openings 924, 944 preferably number between 2 and 5, and more preferably 3 in number.

While this invention has been described with reference to the preferred embodiment described above, it will be appreciated that the configuration of this invention can be varied and that the scope of this invention is defined by the following claims.

The invention claimed is:

1. A terminal system comprising:
a base having a plurality of openings, the plurality of openings including at least one oval opening and at least one round opening, and wherein each of the openings receives a sealing gland;
at least one splice tray;
at least one sealing gland, the at least one sealing gland comprising:
at least one oval sealing gland, which is configured to fit within the at least one oval opening, the at least one oval sealing gland having an oval upper plate, an oval lower plate, and an oval sealing material positioned between the upper and lower plates and having a first opening and a second opening extending through the sealing gland, which are configured to receive to receive a distribution cable, which enters and exits the system through the first and second openings within the at least one oval sealing gland; and
at least one round sealing gland, which is configured to fit within the at least one round opening, the at least one round sealing gland having an upper plate, a lower plate, and a sealing material positioned between the upper and lower plates, and wherein the at least one round sealing gland has two or more openings configured to receive a service cable from the at least one splice tray; and
a housing, which is placed over the at least one splice tray.

2. The system of claim 1, further comprising an organizer adapted to receive the at least on splice tray, the at least one splice tray receives the distribution cable from the at least one oval sealing gland and splices the distribution cable with one or more service cables, and wherein each of the one or more service cables exits the system through one of the one or more round sealing glands.

3. The system of claim 1, further comprising a distribution cable, which enters and exits the system through the at least one oval sealing gland.

4. The system of claim 3, further comprising one or more service cables, which are spliced to the distribution cable via the at least one splice tray and exit the system through the at least one round sealing gland.

5. The system of claim 3, wherein the distribution cable is an optical cable containing one or more optical fiber elements, and wherein each of the optical fiber elements are individually coated with a plastic layer and contained in a protective tube suitable for the environment where the cable is deployed.

6. The system of claim 1, further comprising a lockable sealing clamp for sealing the housing to the base.

7. The system of claim 1, wherein the housing provides an airtight and watertight enclosure for the at least one splice tray.

8. The system of claim 1, wherein the at least one round sealing gland includes at least two round sealing glands and at least one of the round sealing glands is a dummy plug.

9. The system of claim 1, wherein the distribution cable is an optical fiber cable, and the one or more service cables are one or more drop wires and/or cables.

10. The system of claim 1, wherein the at least one oval sealing gland further includes a pair of pressure plates, which are positioned between the upper plate and the sealing material and the lower plate and the sealing material.

11. The system of claim 1, wherein the plurality of openings comprises one oval opening and two round openings, which are configured to receive one oval sealing gland and two round sealing glands, respectively.

12. The system of claim 11, wherein the at least one sealing gland is one oval sealing gland and two round sealing glands.

13. The system of claim 1, wherein the distribution cable enters and exits the base of the system without having to be cut.

14. The system of claim 1, wherein the sealing gland having a pair of slits extending from an outer edge of an elongated portion of the sealing gland to each of the first and second openings within the sealing gland, and wherein the slits extending from the outer edge to the first and second openings within the sealing gland are on a slight diagonal from an upper surface to a lower surface of the sealing gland.

15. The system of claim 1, wherein the two or more openings of the at least one round sealing gland have an oval shape thereto.

16. A terminal system comprising;
a terminal block having at least one splice tray configured to receive an optical cable;
a base having a plurality of openings, each of the openings adapted to receive a sealing gland;
at least one sealing gland, the at least one sealing gland comprising:
at least one oval sealing gland, which is configured to fit within the at least one oval opening, the at least one oval sealing gland having an oval upper plate, an oval lower plate, and an oval sealing material positioned between the upper and lower plates and having a first opening and a second opening extending through the sealing gland, and which are configured to receive to receive an optical distribution cable, which enters and exits the system through the first and second openings within the at least one oval sealing gland; and
at least one round sealing gland, which is configured to fit within the at least one round opening, the at least one round sealing gland having an upper plate, a lower plate, and a sealing material positioned between the upper and lower plates, and wherein the at least one round sealing gland has two or more openings configured to receive a service cable from the at least one splice tray; and
a housing, which is placed over the at least one splice tray and fits on an outer edge of the base.

17. The system of claim 16, further comprising an optical distribution cable, which enters and exits the system through the first and second openings within the at least one oval sealing gland.

18. The system of claim 17, further comprising a service cable, which is spliced to the optical distribution cable via the at least one splice tray.

19. The system of claim 16, wherein the sealing gland having a pair of slits extending from an outer edge of an elongated portion of the sealing gland to each of the first and second openings within the sealing gland, and wherein the slits extending from the outer edge to the first and second openings within the sealing gland are on a slight diagonal from an upper surface to a lower surface of the sealing gland.

20. The system of claim 16, wherein the two or more openings of the at least one round sealing gland have an oval shape thereto.

* * * * *